United States Patent
Ishigaya et al.

(10) Patent No.: US 9,285,737 B2
(45) Date of Patent: Mar. 15, 2016

(54) FIXING DEVICE AND IMAGE FORMING APPARATUS

(71) Applicants: Yasunori Ishigaya, Kanagawa (JP); Kazuhito Kishi, Kanagawa (JP); Ippei Fujimoto, Kanagawa (JP); Keisuke Kawabata, Kanagawa (JP); Misaki Shimizu, Tokyo (JP); Yoshiki Yamaguchi, Kanagawa (JP); Haruyuki Honda, Kanagawa (JP)

(72) Inventors: Yasunori Ishigaya, Kanagawa (JP); Kazuhito Kishi, Kanagawa (JP); Ippei Fujimoto, Kanagawa (JP); Keisuke Kawabata, Kanagawa (JP); Misaki Shimizu, Tokyo (JP); Yoshiki Yamaguchi, Kanagawa (JP); Haruyuki Honda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/577,226

(22) Filed: Dec. 19, 2014

(65) Prior Publication Data
US 2015/0177659 A1 Jun. 25, 2015

(30) Foreign Application Priority Data
Dec. 24, 2013 (JP) ................................. 2013-265126

(51) Int. Cl.
*G03G 15/20* (2006.01)
*G03G 21/20* (2006.01)
*G01J 5/12* (2006.01)

(52) U.S. Cl.
CPC ........ *G03G 15/2078* (2013.01); *G03G 15/2039* (2013.01); *G03G 15/2064* (2013.01); *G03G 21/20* (2013.01); *G01J 5/12* (2013.01); *G01J 2005/123* (2013.01); *G01J 2005/126* (2013.01)

(58) Field of Classification Search
CPC .......... G03G 15/2078; G03G 15/2039; G03G 21/20; G03G 15/2064; G01J 2005/123; G01J 2005/126; G01J 5/12
See application file for complete search history.

(56) References Cited

U.S. PATENT DOCUMENTS

| | | | |
|---|---|---|---|
| 2011/0097098 A1* | 4/2011 | Tsukioka | 399/69 |
| 2011/0229200 A1* | 9/2011 | Yamaguchi et al. | 399/122 |
| 2012/0219308 A1* | 8/2012 | Fukaya | 399/33 |

FOREIGN PATENT DOCUMENTS

| | | |
|---|---|---|
| JP | 6-095540 | 4/1994 |
| JP | 2001-343860 | 12/2001 |
| JP | 2005-181946 | 7/2005 |
| JP | 2008-257247 | 10/2008 |
| JP | 2012-177790 | 9/2012 |

OTHER PUBLICATIONS

U.S. Appl. No. 14/446,812, filed Jul. 30, 2014.

* cited by examiner

*Primary Examiner* — Ryan Walsh
(74) *Attorney, Agent, or Firm* — Duft Bornsen & Fettig LLP (57) ABSTRACT

A fixing device includes a fixing rotator and a pressure rotator contacting the fixing rotator to form a fixing nip therebetween, through which recording media of a plurality of sizes are conveyed. The recording media create a plurality of non-conveyance spans on a lateral end of the fixing rotator in an axial direction thereof where the recording media are not conveyed. A heater is disposed opposite the fixing rotator to heat the fixing rotator. A multi-view thermopile array is disposed opposite an outer circumferential surface of the lateral end of the fixing rotator in the axial direction thereof and angled relative to the fixing rotator to detect a temperature of the fixing rotator. The thermopile array includes an inboard temperature detection element directed to a conveyance span on the fixing rotator where the recording medium of a decreased size is conveyed.

14 Claims, 5 Drawing Sheets

FIXING DEVICE AND IMAGE FORMING APPARATUS

CROSS-REFERENCE TO RELATED APPLICATION

This patent application is based on and claims priority pursuant to 35 U.S.C. §119 to Japanese Patent Application No. 2013-265126, filed on Dec. 24, 2013, in the Japanese Patent Office, the entire disclosure of which is hereby incorporated by reference herein.

BACKGROUND

1. Technical Field

Exemplary aspects of the present disclosure relate to a fixing device and an image forming apparatus, and more particularly, to a fixing device for fixing an image on a recording medium and an image forming apparatus incorporating the fixing device.

2. Description of the Background

Related-art image forming apparatuses, such as copiers, facsimile machines, printers, or multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such fixing device may include a fixing rotator, such as a fixing roller, a fixing belt, and a fixing film, heated by a heater and a pressure rotator, such as a pressure roller and a pressure belt, pressed against the fixing rotator to form a fixing nip therebetween through which a recording medium bearing a toner image is conveyed. As the recording medium bearing the toner image is conveyed through the fixing nip, the fixing rotator and the pressure rotator apply heat and pressure to the recording medium, melting and fixing the toner image on the recording medium.

SUMMARY

This specification describes below an improved fixing device. In one exemplary embodiment, the fixing device includes a fixing rotator rotatable in a predetermined direction of rotation and a pressure rotator contacting the fixing rotator to form a fixing nip therebetween, through which recording media of a plurality of sizes are conveyed. The recording media create a plurality of non-conveyance spans on a lateral end of the fixing rotator in an axial direction thereof where the recording media are not conveyed. A heater is disposed opposite the fixing rotator to heat the fixing rotator. A multi-view thermopile array is disposed opposite an outer circumferential surface of the lateral end of the fixing rotator in the axial direction thereof and angled relative to the fixing rotator to detect a temperature of the fixing rotator. The thermopile array includes an inboard temperature detection element directed to a conveyance span on the fixing rotator where the recording medium of a decreased size is conveyed.

This specification further describes an improved image forming apparatus. In one exemplary embodiment, the image forming apparatus includes an image bearer to bear a toner image and a fixing device, disposed downstream from the image bearer in a recording medium conveyance direction, to fix the toner image on a recording medium. The fixing device includes a fixing rotator rotatable in a predetermined direction of rotation and a pressure rotator contacting the fixing rotator to form a fixing nip therebetween, through which recording media of a plurality of sizes are conveyed. The recording media create a plurality of non-conveyance spans on a lateral end of the fixing rotator in an axial direction thereof where the recording media are not conveyed. A heater is disposed opposite the fixing rotator to heat the fixing rotator. A multi-view thermopile array is disposed opposite an outer circumferential surface of the lateral end of the fixing rotator in the axial direction thereof and angled relative to the fixing rotator to detect a temperature of the fixing rotator. The thermopile array includes an inboard temperature detection element directed to a conveyance span on the fixing rotator where the recording medium of a decreased size is conveyed.

BRIEF DESCRIPTION OF THE DRAWINGS

A more complete appreciation of the disclosure and the many attendant advantages thereof will be readily obtained as the same becomes better understood by reference to the following detailed description when considered in connection with the accompanying drawings, wherein.

DETAILED DESCRIPTION OF THE DISCLOSURE

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Figure 1:
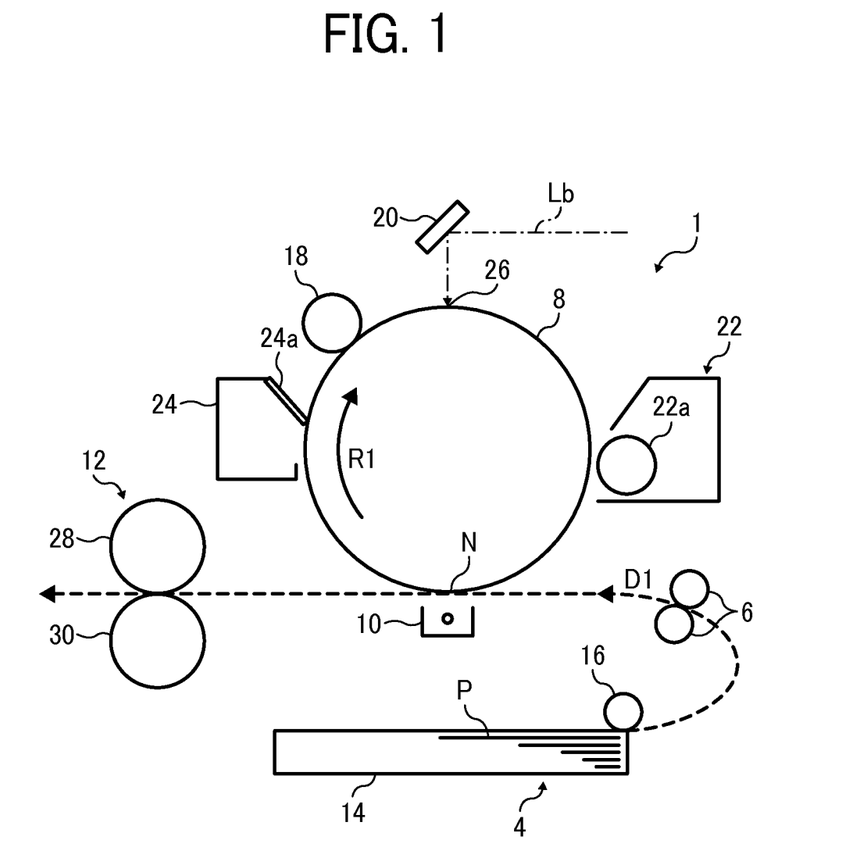
FIG. 1 is a schematic vertical sectional view of an image forming apparatus according to an exemplary embodiment of the present disclosure.

Referring now to the drawings, wherein like reference numerals designate identical or corresponding parts throughout the several views, in particular to FIG. 1, an image forming apparatus 1 according to an exemplary embodiment of the present disclosure is explained.

FIG. 1 is a schematic vertical sectional view of the image forming apparatus 1. The image forming apparatus 1 may be a copier, a facsimile machine, a printer, a multifunction peripheral or a multifunction printer (MFP) having at least one of copying, printing, scanning, facsimile, and plotter functions, or the like. According to this exemplary embodiment, the image forming apparatus 1 is a printer that forms a toner image on a recording medium by electrophotography.

With reference to FIG. 1, a description is provided of a construction of the image forming apparatus 1.

As shown in FIG. 1, the image forming apparatus 1 includes a sheet feeder 4, a registration roller pair 6, a photoconductive drum 8 serving as an image bearer, a transfer device 10, and a fixing device 12.

The sheet feeder 4 includes a paper tray 14 that loads a plurality of sheets P serving as recording media and a feed roller 16 that picks up an uppermost sheet P from the plurality of sheets P loaded on the paper tray 14 and feeds the uppermost sheet P to the registration roller pair 6. The registration roller pair 6 temporarily halts the sheet P conveyed by the feed roller 16. Thereafter, the registration roller pair 6 corrects skew of the sheet P and conveys the sheet P to a transfer nip N formed between the photoconductive drum 8 and the transfer device 10 at a time in synchronism with rotation of the photoconductive drum 8, that is, at a time when a leading edge of a toner image formed on the photoconductive drum 8 corresponds to a predetermined position in a leading edge of the sheet P in a sheet conveyance direction D1.

A charging roller 18 serving as a charger, a mirror 20 serving as a part of an exposure device, a developing device 22 incorporating a developing roller 22a, the transfer device 10, a cleaner 24 incorporating a blade 24a, and the like are arranged around the photoconductive drum 8 in a rotation direction R1 thereof. A light beam Lb reflected by the mirror 20 irradiates and scans the photoconductive drum 8 at an exposure position 26 thereon interposed between the charging roller 18 and the developing device 22 in the rotation direction R1 of the photoconductive drum 8.

A description is provided of an image forming operation to form a toner image on a sheet P that is performed by the image forming apparatus 1 having the construction described above.

As the photoconductive drum 8 starts rotating, the charging roller 18 uniformly charges an outer circumferential surface of the photoconductive drum 8. The exposure device emits a light beam Lb onto the charged outer circumferential surface of the photoconductive drum 8 at the exposure position 26 thereon according to image data sent from an external device such as a client computer, thus forming an electrostatic latent image on the photoconductive drum 8. The electrostatic latent image formed on the photoconductive drum 8 moves in accordance with rotation of the photoconductive drum 8 to an opposed position thereon disposed opposite the developing device 22 where the developing device 22 supplies toner to the electrostatic latent image on the photoconductive drum 8, visualizing the electrostatic latent image as a toner image. As the toner image formed on the photoconductive drum 8 reaches the transfer nip N, the toner image is transferred onto a sheet P conveyed from the paper tray 14 and entering the transfer nip N at a predetermined time by a transfer bias applied by the transfer device 10. The sheet P bearing the toner image is conveyed to the fixing device 12 where a fixing roller 28 and a pressure roller 30 fix the toner image on the sheet P under heat and pressure. Thereafter, the sheet P bearing the fixed toner image is ejected onto an output tray that stacks the sheet P. As residual toner failed to be transferred onto the sheet P at the transfer nip N and therefore remaining on the photoconductive drum 8 moves under the cleaner 24 in accordance with rotation of the photoconductive drum 8, the blade 24a scrapes the residual toner off the photoconductive drum 8, thus cleaning the photoconductive drum 8. Thereafter, a discharger removes a residual potential on the photoconductive drum 8, rendering the photoconductive drum 8 to be ready for a next image forming operation.

Figure 2:
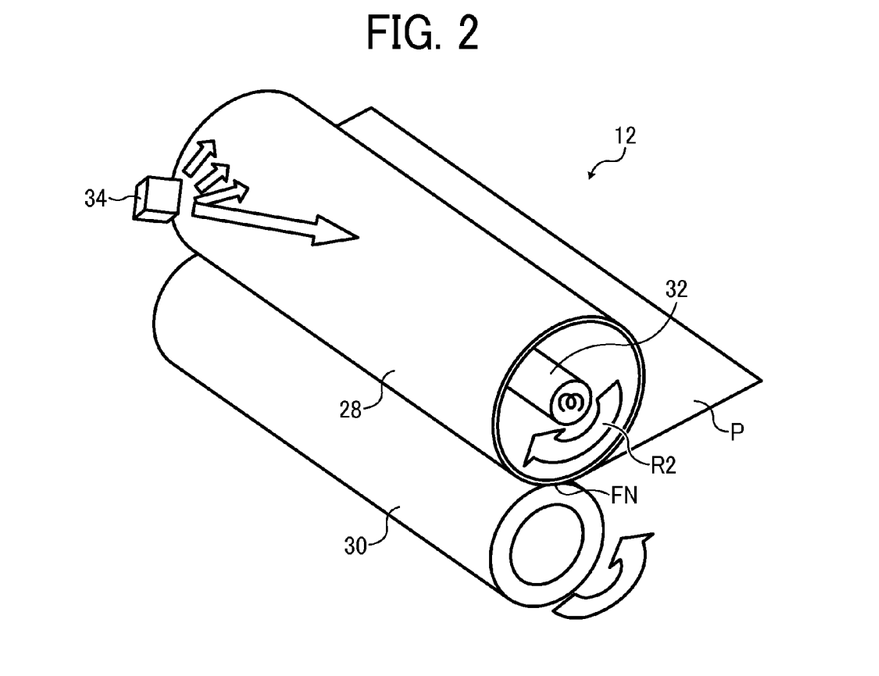
FIG. 2 is a perspective view of a fixing device incorporated in the image forming apparatus shown in FIG. 1.

With reference to FIG. 2, a description is provided of a construction of the fixing device 12 incorporated in the image forming apparatus 1 having the construction described above.

FIG. 2 is a perspective view of the fixing device 12. As shown in FIG. 2, the fixing device 12 (e.g., a fuser or a fusing unit) includes the fixing roller 28 serving as a fixing rotator or a fixing member to come into contact with the toner image on the sheet P, the pressure roller 30 serving as a pressure rotator or a pressure member, a heater 32 disposed opposite the fixing roller 28 to heat the fixing roller 28, and a temperature sensor 34 disposed opposite the fixing roller 28 to detect the temperature of the fixing roller 28. The pressure roller 30 is pressed against the fixing roller 28 by a biasing member to form a fixing nip FN therebetween. As a driver drives and rotates the fixing roller 28, the pressure roller 30 rotates in accordance with rotation of the fixing roller 28. The heater 32 is a heat source situated inside the fixing roller 28 to heat the fixing roller 28 throughout the entire width of the fixing roller 28 in an axial direction thereof. The temperature sensor 34 serving as a temperature detector that detects the temperature of an outer circumferential surface of the fixing roller 28 is a multi-view thermopile array having a plurality of temperature detection elements accommodated inside a single casing. A controller controls a power supply that supplies power to the heater 32 based on a temperature of the fixing roller 28 detected by the temperature sensor 34. For example, the controller (e.g., a processor) is a micro computer including a central processing unit (CPU), a read-only memory (ROM), a random-access memory (RAM), and an input-output (I/O) interface.

Figure 3:
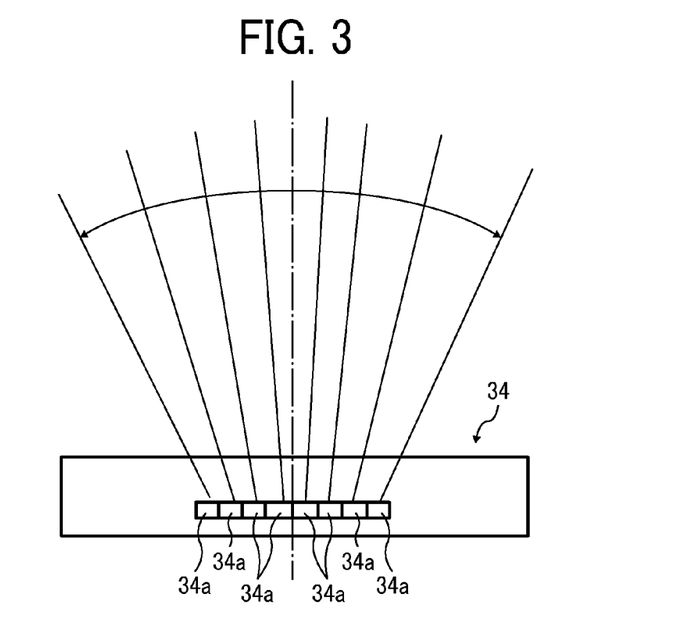
FIG. 3 is a schematic diagram of a temperature sensor incorporated in the fixing device shown in FIG. 2.

With reference to FIG. 3, a detailed description is now given of a construction of the temperature sensor 34.

FIG. 3 is a schematic diagram of the temperature sensor 34. As shown in FIG. 3, the temperature sensor 34 includes a plurality of temperature detection elements 34a accommodated inside the single casing.

The temperature sensor 34 is disposed opposite one lateral end span on the fixing roller 28, that is, one lateral end in proximity to a lateral edge of the fixing roller 28, in the axial direction thereof and angled relative to the fixing roller 28 such that the temperature sensor 34 is directed to a center span on the fixing roller 28 in the axial direction thereof. Hence, a plurality of temperature detection spans corresponding to the plurality of temperature detection elements 34a including inboard and outboard temperature detection elements 34a is aligned on the outer circumferential surface of the fixing roller 28 throughout substantially a half span on the fixing roller 28 in the axial direction thereof. A temperature distribution on the outer circumferential surface of the fixing roller 28 is symmetrical in the axial direction of the fixing roller 28. The temperature sensor 34 detects the temperature of the outer circumferential surface of the fixing roller 28 rotating in a rotation direction R2 depicted in FIG. 2 in each temperature detection span on the fixing roller 28 and outputs the detected temperature to the controller. The thermopile array (e.g., an array type thermopile) may employ various configurations. For example, the thermopile array of the temperature sensor 34 includes eight temperature detection elements 34a that have a maximum angle of 90 degrees. In order to increase the number of the temperature detection spans on the outer circumferential surface of the fixing roller 28, the number of thermopiles or thermopile arrays may be increased.

Figure 4:
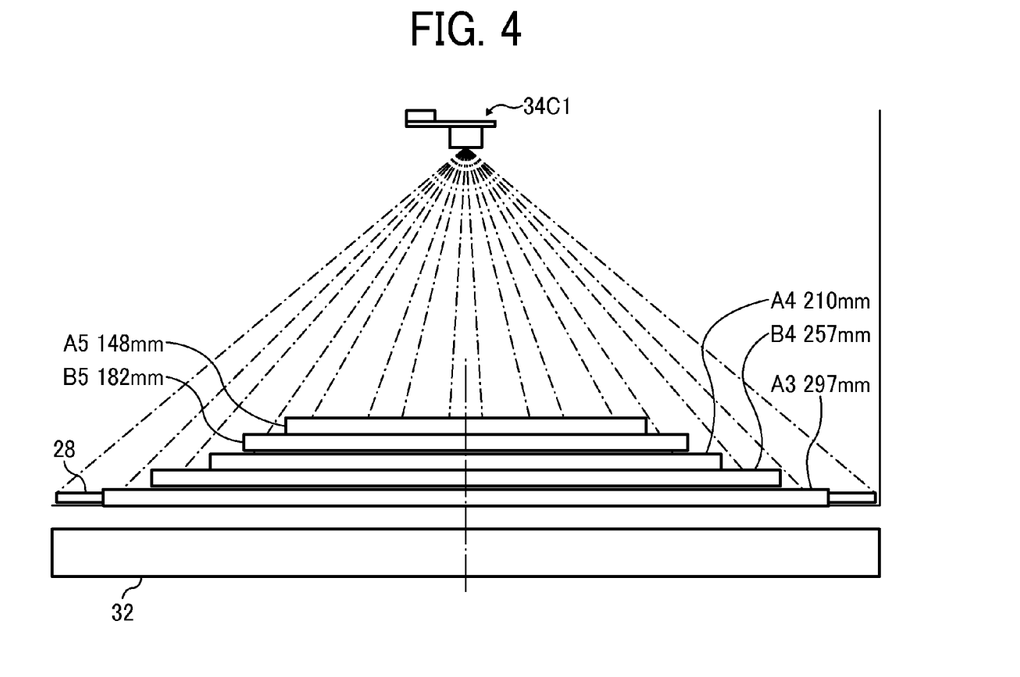
FIG. 4 is a schematic diagram of a comparative temperature sensor, sheets of various sizes, and a heater.
Figure 5:
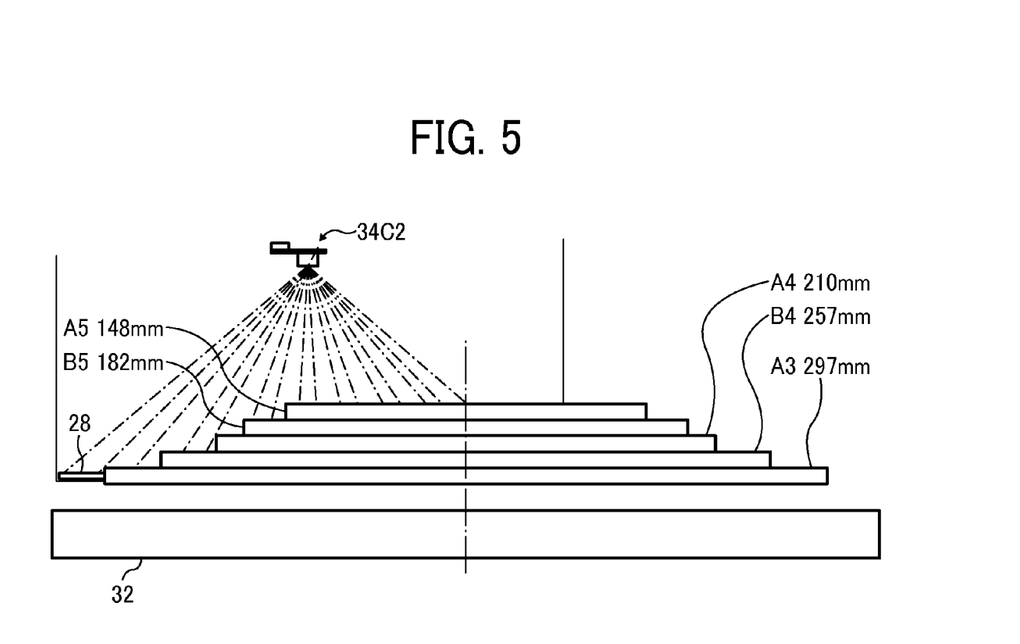
FIG. 5 is a schematic diagram of another comparative temperature sensor, sheets of various sizes, and a heater.

With reference to FIGS. 4 and 5, a description is provided of a configuration of each of comparative temperature sensors 34C1 and 34C2 incorporating a thermopile.

FIG. 4 is a schematic diagram of the comparative temperature sensor 34C1, sheets of various sizes, and the heater 32. FIG. 5 is a schematic diagram of the comparative temperature sensor 34C2, sheets of various sizes, and the heater 32. In FIGS. 4 and 5, the sheets are centered on the fixing roller 28 as they are conveyed over the fixing roller 28.

Although the fixing roller 28 having a decreased thermal capacity is driven and heated during printing after reception of a print job, due to the decreased thermal capacity, the fixing roller 28 may suffer from overheating in a non-conveyance span thereon where the sheets are not conveyed and therefore do not draw heat from the fixing roller 28.

When the sheets are centered on the fixing roller 28 in the axial direction thereof as they are conveyed over the fixing roller 28, the sheets of various sizes, that is, the sheets of frequently used sizes, are positioned relative to the fixing roller 28 and the heater 32 as shown in FIG. 4. The sizes of the sheets are an A5 size having a width of 148 mm, a B5 size having a width of 182 mm, an A4 size having a width of 210 mm, a B4 size having a width of 257 mm, and an A3 size having a width of 297 mm in the axial direction of the fixing roller 28. For example, since all of the sheets of various sizes are conveyed over at least the center span on the fixing roller 28 in the axial direction thereof, the comparative temperature sensor 34C1 is not requested to detect the temperature of the center span on the fixing roller 28 by dividing the center span into minute temperature detection spans. Conversely, the sheets of various sizes create various non-conveyance spans where the sheets are not conveyed at each lateral end of the fixing roller 28 in the axial direction thereof. Accordingly, if the comparative temperature sensor 34C1 is disposed opposite the center span on the fixing roller 28 in the axial direction thereof as shown in FIG. 4, the comparative temperature sensor 34C1 may detect the temperature of the fixing roller 28 unnecessarily at various temperature detection spans. Consequently, the comparative temperature sensor 34C1 may not detect the temperature of the fixing roller 28 precisely at each lateral end span on the fixing roller 28, that is, each lateral end in proximity to the lateral edge of the fixing roller 28, in the axial direction thereof where precise detection is required.

FIG. 5 illustrates the comparative temperature sensor 34C2 disposed opposite the fixing roller 28 at substantially a boundary between the center span and one lateral end span on the fixing roller 28 in the axial direction thereof. Hence, although the comparative temperature sensor 34C2 incorporates a thermopile array identical to that of the comparative temperature sensor 34C1 depicted in FIG. 4, the comparative temperature sensor 34C2 detects the temperature of the lateral end of the fixing roller 28 in the axial direction thereof more precisely than the comparative temperature sensor 34C1. However, temperature detection elements of the comparative temperature sensor 34C2 that are disposed opposite the center span on the fixing roller 28 in the axial direction thereof still detect the temperature of the fixing roller 28 in a conveyance span in the axial direction thereof where all of the sheets of various sizes are conveyed, thus detecting the temperature of the fixing roller 28 ineffectively.

Figure 6:
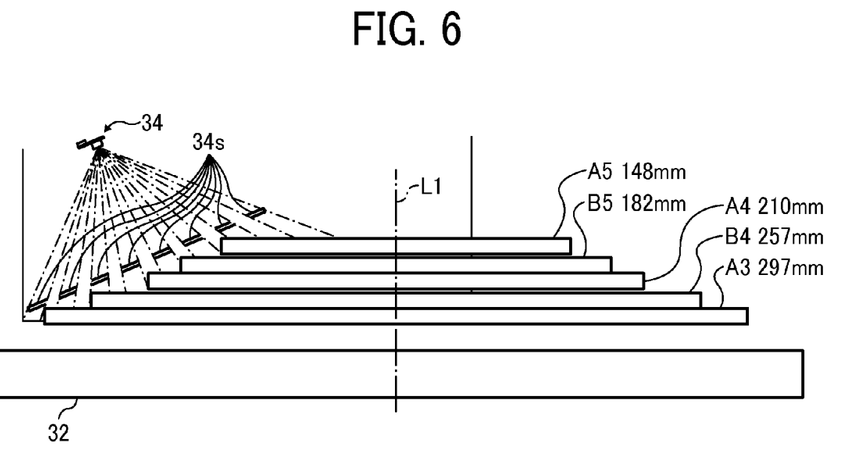
FIG. 6 is a schematic diagram of the temperature sensor, sheets of various sizes, and a heater incorporated in the fixing device shown in FIG. 2.

To address this circumstance, the temperature sensor 34 (e.g., a thermopile array) of the fixing device 12 has a configuration described below. FIG. 6 is a schematic diagram of the temperature sensor 34, sheets of various sizes, and the heater 32. In FIG. 6, the sheets are centered on the fixing roller 28 in the axial direction thereof as they are conveyed over the fixing roller 28. As shown in FIG. 6, the temperature sensor 34 is disposed opposite one lateral end span on the fixing roller 28, that is, one lateral end in proximity to one lateral edge of the fixing roller 28, in the axial direction thereof and angled relative to the fixing roller 28 such that the temperature sensor 34 is directed to the center span on the fixing roller 28 in the axial direction thereof. That is, the temperature sensor 34 is tilted relative to the axial direction of the fixing roller 28.

A plurality of temperature detection spans 34$s$ corresponding to the plurality of temperature detection elements 34$a$ depicted in FIG. 3 is aligned on the outer circumferential surface of the fixing roller 28 in the axial direction thereof. Each inboard temperature detection element 34$a$ of the tilted temperature sensor 34 that is directed to the center span on the fixing roller 28 in the axial direction thereof creates an increased temperature detection span 34$s$ on the fixing roller 28 where each inboard temperature detection element 34$a$ detects the temperature of the fixing roller 28 that is greater than a temperature detection span 34$s$ on the fixing roller 28 where each inboard temperature detection element of the comparative temperature sensor 34C2 depicted in FIG. 5 detects the temperature of the fixing roller 28. A most inboard temperature detection element 34$a$ of the temperature sensor 34 situated closest to a center line L1, that is, a recording medium conveyance reference, of the fixing roller 28 in the axial direction thereof creates a temperature detection span not reaching the center line L1 corresponding to a center of the sheet in the axial direction of the fixing roller 28 because the most inboard temperature detection element 34$a$ is requested to detect the temperature of the fixing roller 28 in the conveyance span thereon where a minimum size sheet (e.g., an A5 size sheet) available in the image forming apparatus 1 is conveyed.

Accordingly, the temperature sensor 34 detects the temperature of the fixing roller 28 in the temperature detection spans 34$s$ created minutely in the lateral end of the fixing roller 28 to correspond to the sheets of various sizes for precise detection. Consequently, the temperature sensor 34 disposed opposite the lateral end of the fixing roller 28 in the axial direction thereof and angled relative to the fixing roller 28 detects the temperature of the fixing roller 28 at the lateral end of the fixing roller 28 precisely so as to prevent overheating of the lateral end of the fixing roller 28 where the sheets are not conveyed, which may occur as the sheets of various sizes are conveyed over the fixing roller 28, thus suppressing thermal breakage of the fixing roller 28.

FIG. 6 illustrates the temperature sensor 34 installed in the fixing device 12 employing a center alignment method in which the sheets are centered on the fixing roller 28 at the center line L1 as they are conveyed over the fixing roller 28. Alternatively, the temperature sensor 34 may be installed in the fixing device 12 employing a lateral edge alignment method in which the sheets are aligned along one lateral edge line of the fixing roller 28 in the axial direction thereof as they are conveyed over the fixing roller 28. For example, in each of the center alignment method and the lateral edge alignment method, the temperature sensor 34 is disposed opposite the fixing roller 28 at a position spaced apart from the recording medium conveyance reference (e.g., the center line L1 and the lateral edge line) that defines the position of the sheet in the axial direction of the fixing roller 28. Additionally, the temperature sensor 34 is angled or tilted relative to the fixing roller 28 to create a temperature detection span 34$s$ on the fixing roller 28 corresponding to the conveyance span on the fixing roller 28 where the minimum size sheet available in the fixing device 12 is conveyed.

Figure 7:
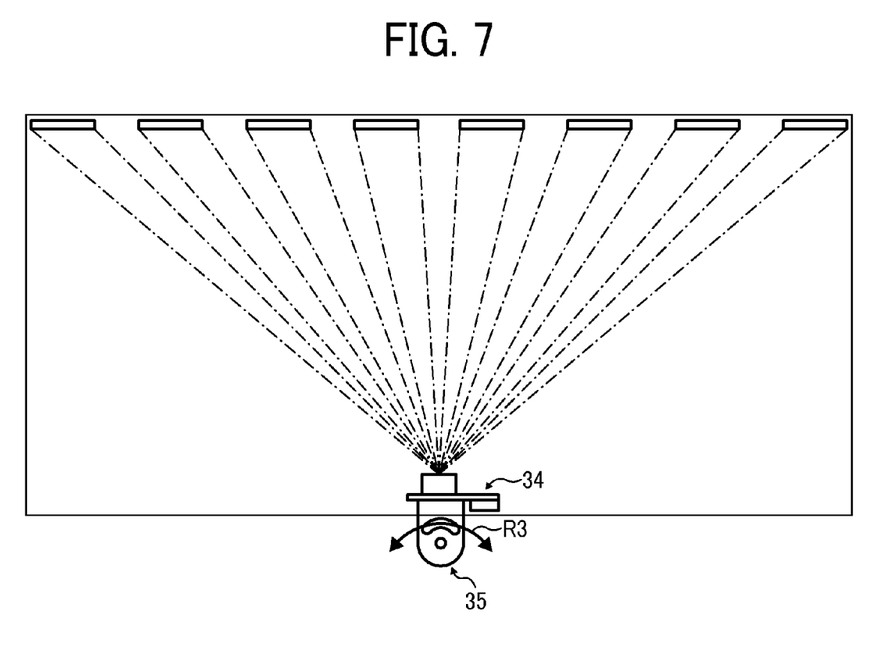
FIG. 7 is a schematic diagram of the temperature sensor shown in FIG. 6 and an angle adjuster mounting the temperature sensor.
Figure 8:
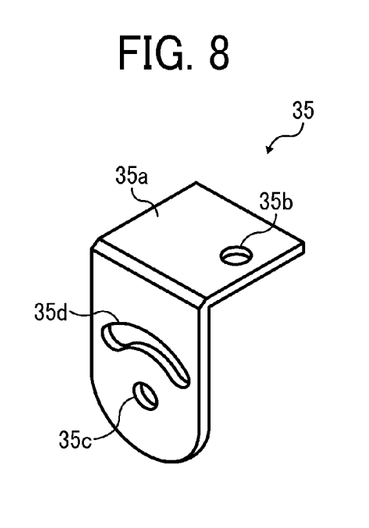
FIG. 8 is a perspective view of the angle adjuster shown in FIG. 7.

With reference to FIGS. 7 and 8, a description is provided of a construction of an angle adjuster 35 that adjusts the angle of the temperature sensor 34.

FIG. 7 is a schematic diagram of the temperature sensor 34 and the angle adjuster 35. FIG. 8 is a perspective view of the angle adjuster 35.

In order to detect the temperature of the fixing roller 28 in an increased span on the fixing roller 28 in the axial direction thereof, the temperature sensor 34 is spaced apart from the outer circumferential surface of the fixing roller 28 with an interval therebetween in a range of from about 3 cm to about 10 cm, for example. As shown in FIG. 7, the temperature sensor 34 is attached with or mounted on the angle adjuster 35 that adjusts the angle of the temperature sensor 34 so that the temperature sensor 34 spaced apart from the fixing roller 28 with the relatively increased interval therebetween detects the temperature of the outer circumferential surface of the fixing roller 28 precisely as the sheets of various sizes are conveyed over the fixing roller 28.

Various configurations selectable according to the size or the like of the temperature sensor 34 and the fixing device 12 are available for the angle adjuster 35. For example, as shown in FIG. 8, the angle adjuster 35 includes a sensor mount 35a that mounts the temperature sensor 34; a sensor mount through-hole 35b though which the temperature sensor 34 is secured to the sensor mount 35a with a screw or the like; a rotation axis through-hole 35c about which the angle adjuster 35 is rotatable in a rotation direction R3 depicted in FIG. 7; and an angle adjustment through-hole 35d defining the adjustable angle of the temperature sensor 34. Screws are inserted into the rotation axis through-hole 35c and the angle adjustment through-hole 35d, respectively, to define the angle of the angle adjuster 35. Thus, the angle of the temperature sensor 34 mounted on the angle adjuster 35 is adjusted.

The fixing device 12 actuated under high temperatures may be replaced with a new one due to its product life and failure. Hence, the fixing device 12 is removable from the image forming apparatus 1. After the fixing device 12 is removed from the image forming apparatus 1, the temperature sensor 34 remains inside the image forming apparatus 1. Accordingly, even when the fixing device 12 is replaced, the temperature sensor 34 is not replaced, saving resources and reducing maintenance costs.

Figure 9:
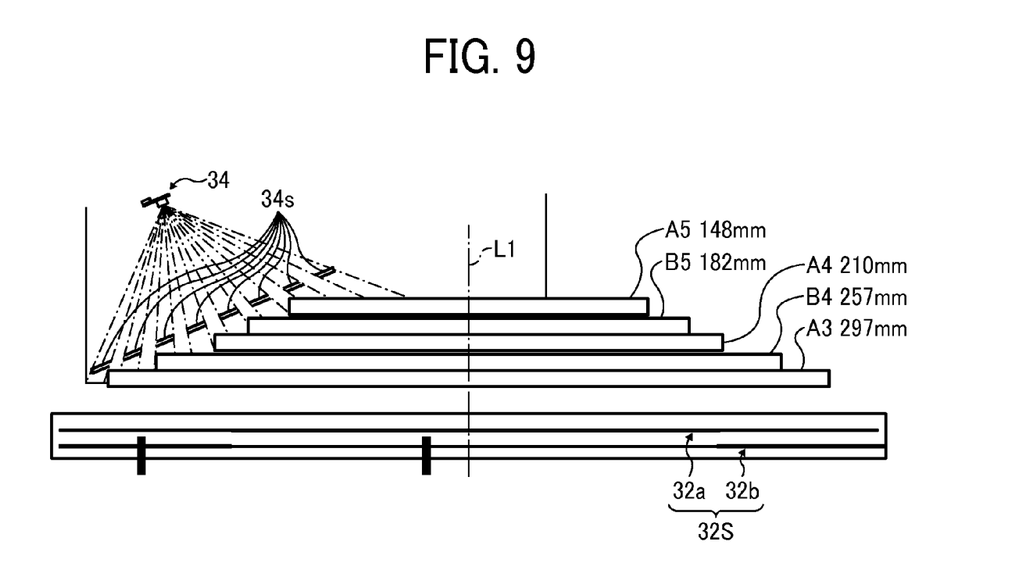
FIG. 9 is a schematic diagram of the temperature sensor shown in FIG. 6, sheets of various sizes, and a heater constructed of two heat generators as a variation of the heater shown in FIG. 6.

With reference to FIG. 9, a description is provided of a construction of a heater 32S incorporating a plurality of heat generators, that is installable in the fixing device 12.

FIG. 9 is a schematic diagram of the temperature sensor 34, sheets of various sizes, and the heater 32S constructed of two heat generators. As shown in FIG. 9, the heater 32S includes a first heat generator 32a disposed opposite and heating the center span on the fixing roller 28 in the axial direction thereof and a second heat generator 32b disposed opposite and heating each lateral end span on the fixing roller 28 in the axial direction thereof so as to even the temperature distribution of the fixing roller 28. Alternatively, the heater 32S may be constructed of three or more heat generators to heat three or more spans on the fixing roller 28 in the axial direction thereof. In such configurations also, the temperature sensor 34 is disposed opposite one lateral end span on the fixing roller 28, that is, one lateral end in proximity to one lateral edge of the fixing roller 28, in the axial direction thereof and angled or tilted relative to the fixing roller 28 such that the temperature sensor 34 is directed to the center span on the fixing roller 28 in the axial direction thereof.

Since the temperature sensor 34 includes the thermopile array that detects the temperature of the fixing roller 28 in an increased span on the fixing roller 28 in the axial direction thereof, it is not necessary to locate a plurality of temperature sensors disposed opposite a plurality of heaters (e.g., the first heat generator 32a and the second heat generators 32b) extending in different spans in the axial direction of the fixing roller 28, respectively. Accordingly, the thermopile array is used effectively. For example, with a single thermopile array, the temperature of each lateral end of the fixing roller 28 in the axial direction thereof is controlled precisely with reduced manufacturing costs compared to a configuration to detect the temperature of the fixing roller 28 with a plurality of temperature sensors.

A description is provided of advantages of the fixing device 12 described above.

As shown in FIG. 2, the fixing device 12 includes a fixing rotator (e.g., the fixing roller 28) rotatable in a predetermined direction of rotation while contacting a toner image on a recording medium (e.g., the sheet P); a pressure rotator (e.g., the pressure roller 30) contacting the fixing rotator to form the fixing nip FN therebetween through which recording media of a plurality of sizes are conveyed, the recording media to create a plurality of non-conveyance spans on a lateral end of the fixing rotator in an axial direction thereof where the recording media are not conveyed; a heater (e.g., the heaters 32 and 32S) disposed opposite the fixing rotator to heat the fixing rotator; a controller to control the heater; and a multi-view thermopile array (e.g., the temperature sensor 34) serving as a temperature detector that detects the temperature of an outer circumferential surface of the fixing rotator. The thermopile array is disposed opposite the lateral end of the fixing rotator in the axial direction thereof that is spaced apart from a recording medium conveyance reference (e.g., the center line L1 and the lateral edge line) that defines the position of the recording medium in the axial direction of the fixing rotator. The thermopile array is angled or tilted relative to the fixing rotator and includes an inboard temperature detection element (e.g., the inboard temperature detection element 34a) that detects the temperature of the fixing rotator in a conveyance span in the axial direction thereof where a recording medium of a decreased size, for example, a minimum size recording medium available in the fixing device, is conveyed.

Accordingly, the single thermopile array serving as a temperature detector monitors various non-conveyance spans on the fixing rotator in the axial direction thereof where the recording media are not conveyed, reducing manufacturing costs and enhancing accuracy in detecting the temperature of the non-conveyance spans on the fixing rotator where accurate temperature detection is requested.

According to the exemplary embodiments described above, the fixing roller 28 serves as a fixing rotator. Alternatively, a fixing belt, a fixing film, a fixing sleeve, or the like may be used as a fixing rotator. Further, the pressure roller 30 serves as a pressure rotator. Alternatively, a pressure belt or the like may be used as a pressure rotator.

The present disclosure has been described above with reference to specific exemplary embodiments. Note that the present disclosure is not limited to the details of the embodiments described above, but various modifications and enhancements are possible without departing from the spirit and scope of the disclosure. It is therefore to be understood that the present disclosure may be practiced otherwise than as specifically described herein. For example, elements and/or features of different illustrative exemplary embodiments may be combined with each other and/or substituted for each other within the scope of the present disclosure.

What is claimed is:

1. A fixing device comprising:
   a fixing rotator rotatable in a predetermined direction of rotation;
   a pressure rotator contacting the fixing rotator to form a fixing nip therebetween, the fixing nip through which recording media of a plurality of sizes are conveyed, the recording media to create a plurality of non-conveyance spans on a lateral end of the fixing rotator in an axial direction thereof where the recording media are not conveyed;
   a heater disposed opposite the fixing rotator to heat the fixing rotator; and
   a multi-view thermopile array disposed opposite an outer circumferential surface of the lateral end of the fixing rotator in the axial direction thereof and tilted at an angle relative to the fixing rotator to detect a temperature of the fixing rotator,
   the thermopile array including an inboard temperature detection element directed to a conveyance span on the fixing rotator where the recording medium of a decreased size is conveyed.

2. The fixing device according to claim 1, wherein the thermopile array is spaced apart from a recording medium conveyance reference that defines a position of the recording medium in the axial direction of the fixing rotator.

3. The fixing device according to claim 1, further comprising an angle adjuster mounting the thermopile array to adjust the angle of the thermopile array relative to the fixing rotator.

4. The fixing device according to claim 3, wherein the thermopile array is spaced apart from the outer circumferential surface of the fixing rotator with an interval therebetween in a range of from about 3 cm to about 10 cm.

5. The fixing device according to claim 1, wherein the heater includes:
   a first heat generator disposed opposite a first span on the fixing rotator in the axial direction thereof; and
   a second heat generator disposed opposite a second span on the fixing rotator in the axial direction thereof that is different from the first span.

6. The fixing device according to claim 5, wherein the first span on the fixing rotator is at a center of the fixing rotator in the axial direction thereof and the second span on the fixing rotator is at the lateral end of the fixing rotator in the axial direction thereof.

7. The fixing device according to claim 1, wherein the thermopile array further includes a plurality of outboard temperature detection elements to create, together with the inboard temperature detection element, a plurality of temperature detection spans aligned on the fixing rotator throughout substantially a half span on the fixing rotator in the axial direction thereof.

8. The fixing device according to claim 7, wherein the inboard temperature detection element creates an increased temperature detection span on the fixing rotator in the axial direction thereof.

9. The fixing device according to claim 8, wherein the increased temperature detection span does not reach a recording medium conveyance reference on the fixing rotator in the axial direction thereof corresponding to a center of the recording medium.

10. The fixing device according to claim 1, wherein the angled thermopile array is directed to a center span on the fixing rotator in the axial direction thereof.

11. The fixing device according to claim 1, wherein the fixing rotator includes a fixing roller.

12. The fixing device according to claim 1, wherein the pressure rotator includes a pressure roller.

13. An image forming apparatus comprising:
    an image bearer to bear a toner image; and
    a fixing device, disposed downstream from the image bearer in a recording medium conveyance direction, to fix the toner image on a recording medium,
    the fixing device including:
       a fixing rotator rotatable in a predetermined direction of rotation;
       a pressure rotator contacting the fixing rotator to form a fixing nip therebetween, the fixing nip through which recording media of a plurality of sizes are conveyed, the recording media to create a plurality of non-conveyance spans on a lateral end of the fixing rotator in an axial direction thereof where the recording media are not conveyed;
       a heater disposed opposite the fixing rotator to heat the fixing rotator; and
       a multi-view thermopile array disposed opposite an outer circumferential surface of the lateral end of the fixing rotator in the axial direction thereof and tilted at an angle relative to the fixing rotator to detect a temperature of the fixing rotator,
       the thermopile array including an inboard temperature detection element directed to a conveyance span on the fixing rotator where the recording medium of a decreased size is conveyed.

14. The image forming apparatus according to claim 13,
    wherein the fixing device is removable from the image forming apparatus, and
    wherein, when the fixing device is removed from the image forming apparatus, the thermopile array remains inside the image forming apparatus.

* * * * *